B. FRANKLIN.
Plow and Farm Truck.

No. 212,919. Patented Mar. 4, 1879.

WITNESSES

INVENTOR
Benjamin Franklin
by E. W. Anderson,
ATTORNEY

UNITED STATES PATENT OFFICE.

BENJAMIN FRANKLIN, OF JAMESTOWN, NEW YORK.

IMPROVEMENT IN PLOW AND FARM TRUCKS.

Specification forming part of Letters Patent No. 212,919, dated March 4, 1879; application filed December 4, 1878.

*To all whom it may concern:*

Be it known that I, BENJAMIN FRANKLIN, of Jamestown, Chautauqua county, State of New York, have invented a new and useful Improvement in Plow and Farm Trucks, which improvement is fully set forth in the following specification, reference being had to the accompanying drawings, in which—

Figure 1:
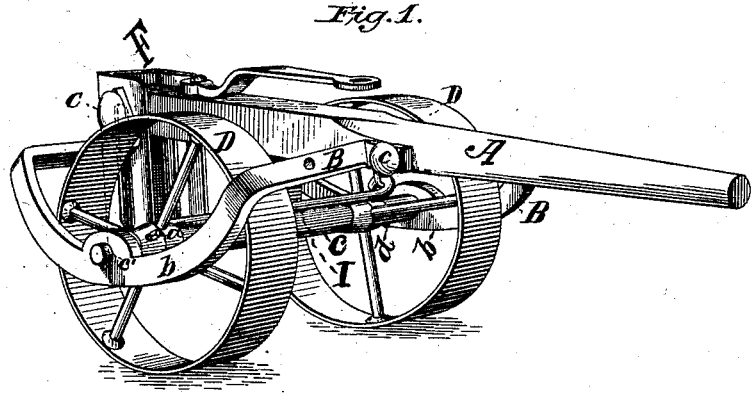
Figure 2:
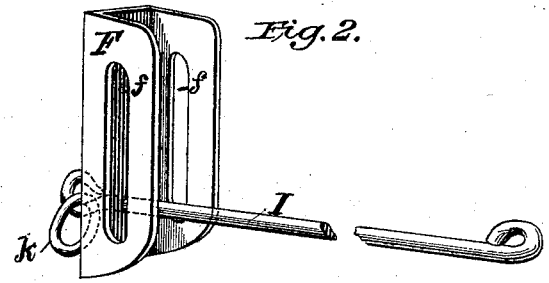

Figure 1 is a perspective view, and Fig. 2 is a detail of the clevis.

This invention relates to certain improvements in trucks for plows and other farm implements; and it has for its object to provide a draft attachment that can be adjusted at will, so as to adapt it to use with various farm implements, as may be desired.

The nature of the invention consists in the construction and novel arrangement of parts, as hereinafter shown and described.

In the accompanying drawings, the letter A represents the draft-pole of my improved sulky or draft attachment, and B the frame, which forms the bearings of the axle or wheel shaft, consisting of two downwardly-curved metallic sections, $b$ $b$, one secured to each side of the draft-pole by means of bolts $c$ or other equivalent devices passing through its ends.

The letter C represents the axle journaled in bearings $c'$ in the middle or lowest part of said frame, as shown. Upon said axle or shaft are loosely mounted the wheels D D, which are provided at their hubs with set-screws $d$ $d$, by means of which they may be held upon said axle so as to turn with it, and at the same time may be adapted to be shifted longitudinally along said axle or shaft so as to be set to or from each other, as occasion may require.

The letter F represents a U-shaped vertically-adjustable attachment or clevis provided with slots $f$ $f$ and adapted to embrace and slide vertically upon the rear end of the draft-pole of the carriage and to be clamped in any desired position thereon by means of the screw-bolt $c$, which also serves to secure the rear part of the frame B to the draft-pole.

I represents a draft rod or bar, pivoted at its front end to the under side of the draft-pole, and extending backwardly through the vertically-adjustable clevis F, laterally slotted for the passage of the bolt which secures the rear ends of the sections, the end of said bar being provided with a loop, $k$, by means of which the plow or other farm implement may be attached to the same.

The operation of my invention is as follows: The plow or other farm implement is attached to the loop $k$, and the clevis F adjusted to correspond to the height of the same. The wheels are then adjusted to or from each other, as may be desired, so as to adapt the carriage to the use intended—that is to say, a harrow or other farm implement—and the same is then ready for use.

I am aware that a clevis attached to a farm-truck so as to be vertically adjusted is not new; hence I make no broad claim to such devices.

Having thus described my invention, what I claim as new, and desire to secure by Letters Patent, is—

1. The combination, in a farm-truck, of the draft-pole A and U-shaped clevis F, having slots $f$, and adapted to embrace and slide vertically upon the rear end of the draft-pole, the draft-rod I, pivoted to said draft-pole, extending rearwardly through said clevis, and provided with loop $k$, substantially as specified.

2. The combination, in a farm-truck, of the draft-pole A, curved sectional frame B, forming journals $c'$ for the axle C, carrying the adjustable wheels D, the U-shaped clevis F, provided with adjusting-slots $f$, engaging bolt $c$ on the rear end of said pole, and the longitudinal draft-rod I, passing through said clevis, connected to the draft-pole, and provided with a loop, $k$, whereby a plow or other farm implement may be attached, as specified.

BENJAMIN FRANKLIN. [L. S.]

Witnesses:
JOSIAH DAVIS,
DAVID SMITH, Jr.